United States Patent
Hsieh et al.

(10) Patent No.: US 6,879,308 B2
(45) Date of Patent: Apr. 12, 2005

(54) HOUSING FOR FLAT PANEL DISPLAYS AND METHOD FOR RECEIVING FLAT PANEL DISPLAYS

(75) Inventors: Ching-Tung Hsieh, Taipei (TW); Kai-Yu Sun, Hsin-chu Hsien (TW)

(73) Assignee: AU Optronics Corp., Hsinchu (TW)

(*) Notice: Subject to any disclaimer, the term of this patent is extended or adjusted under 35 U.S.C. 154(b) by 231 days.

(21) Appl. No.: 09/984,759

(22) Filed: Oct. 31, 2001

(65) Prior Publication Data

US 2002/0050977 A1 May 2, 2002

(30) Foreign Application Priority Data

Nov. 1, 2000 (TW) .................................... 89122939 A

(51) Int. Cl.⁷ .................................................. G09G 3/36
(52) U.S. Cl. .......................................... 345/87; 349/58
(58) Field of Search ..................... 345/87–102; 349/58; 361/681

(56) References Cited

U.S. PATENT DOCUMENTS

| | | | | |
|---|---|---|---|---|
| 5,233,502 A | * | 8/1993 | Beatty et al. | 361/681 |
| 5,946,061 A | * | 8/1999 | Kurihara et al. | 349/58 |
| 6,100,869 A | * | 8/2000 | Angermuller et al. | 345/102 |
| 6,128,183 A | * | 10/2000 | Uchiyama et al. | 361/681 |
| 6,373,537 B2 | * | 4/2002 | Yun et al. | 349/58 |
| 6,392,723 B1 | * | 5/2002 | Sugiyama et al. | 349/58 |
| 6,421,231 B1 | * | 7/2002 | Jung | 361/681 |

FOREIGN PATENT DOCUMENTS

| | | |
|---|---|---|
| JP | 4-57818 | 5/1992 |
| JP | 4288526 | 10/1992 |
| JP | 5-79536 | 10/1993 |
| JP | 10339868 | 12/1998 |
| JP | 2000092415 | 3/2000 |

\* cited by examiner

*Primary Examiner*—Dennis-Doon Chow
*Assistant Examiner*—Srilakshmi K. Kumar
(74) *Attorney, Agent, or Firm*—Bacon & Thomas

(57) ABSTRACT

A housing for receiving a flat panel display and/or a backlight module. The housing includes a front frame having a central window, wherein the inner edge of the frame defines an active area for the flat panel display, a bottom frame, a side frame locating between the front frame and the bottom frame to form a space and at least one opening. At least one separate plate is located on the inside surface of the side frame for separating the flat panel display and/or a backlight module. The housing includes a stopping frame having a reflector, a cavity, and pores to prevent the flat panel display or a backlight module from sliding out of the space.

15 Claims, 2 Drawing Sheets

HOUSING FOR FLAT PANEL DISPLAYS AND METHOD FOR RECEIVING FLAT PANEL DISPLAYS

BACKGROUND OF THE INVENTION

1. Field of the Invention

The present invention relates to a housing for receiving a display device and, more particularly, to a housing for a flat panel display and a method for assembling the housing and the flat panel display.

2. Description of Related Art

Currently, the flat panel displays are combined with many plastic or metallic frames outside the panel for protecting from impact. For example, the liquid crystal display, as shown in FIG. 1, is often manufactured through assembling a backlight module 44 with a top frame 40, a liquid crystal display panel module 41, a bottom shield 42, a backlight module 44 and a backlight shield 43 together. However, this kind of assembly needs to waste a lot of time and materials for manufacturing and coordinating these housing and frames. This assembly increases the costs for manufacturing flat panel display and takes a lot of time for the coordination of molds manufacturers and panel assemblers. In addition, the conventional assembly of display panels and frames is not convenient to assemble or to disassemble. Moreover, the weight of the many frames also increases the total weight of the whole flat panel display.

On the other hand, the heat produced from the light source of the flat panel display or the backlight module also causes deterioration of image quality. In most cases, the heat arising from the light source increases the local temperature of the side part of the display panel close to the light source. Therefore, the color of the area close to the light source becomes an unexpected color (e.g. displaying yellow color instead of displaying white color).

Therefore, it is desirable to provide an improved assembly of the flat panel display and a method for assembling the flat panel display and the protecting housing to mitigate and obviate the aforementioned problems.

SUMMARY OF THE INVENTION

The object of the present invention is to provide a housing for receiving a flat panel display and/or a backlight module to reduce the number of moldings for manufacturing housing or frames, to save the time and the cost required for making said housing, and to lower down the temperature effect caused by the heat produced by the light source of the flat panel display or the backlight module to deteriorate the image quality.

Another object of the present invention is to provide a light housing to reduce the total weight of the combined assembly of said housing and the display panel and/or the backlight module, and to easily assemble or disassemble the combined assembly of said housing and the display panel and/or the backlight module.

Another object of the present invention is to provide a simple method to assemble the display panel and/or the backlight module and the housing, to lower down the temperature effect on display quality caused by the heat produced by the light source of the flat panel display or the backlight module, and further to reduce the weight of the combined assembly of the display panel and/or the backlight module and the housing.

To achieve the object, the housing for receiving a flat panel display and/or a backlight module of the present invention comprises: a front frame having a central window, wherein the inner edge of said frame defines an active area for said flat panel display; a bottom frame; a side frame locating between said front frame and said bottom frame to form a space and at least one opening, wherein said space is used for locating said flat panel display and/or a backlight module, and said flat panel display and/or a backlight module is allowed to slid into said space through said opening; at least one separate plate locating on the inside surface of said side frame for separating said flat panel display and/or a backlight module; and a stopping frame having a reflector, a cavity, and a plurality of pores to prevent said flat panel display or a backlight module from sliding out of said space formed by said side frames, said front frame and said bottom frame, wherein said reflector locates inside said cavity of said stopping frame, and said pores locates on the outer surface of said stopping frame.

The method for assembling a flat panel display, comprising following steps: (A) providing a flat panel display, optionally a backlight module, a housing for receiving a flat panel display, comprising: a front frame having a central window, wherein the inner edge of said frame defines an active area for said flat panel display; a bottom frame; a side frame locating between said front frame and said bottom frame to form a space and at least one opening, wherein said space is used for locating said flat panel display and/or a backlight module, and said flat panel display and/or a backlight module is allowed to slid into said space through said opening; at least one separate plate locating on the inside surface of said side frame for separating said flat panel display and/or a backlight module; and a stopping frame having a reflector, a cavity, and a plurality of pores to prevent said flat panel display or a backlight module from sliding out of said space formed by said side frames, said front frame and said bottom frame, wherein said reflector locates inside said cavity of said stopping frame, and said pores locates on the outer surface of said stopping frame; (B) sliding said flat panel display and/or a backlight module into said space surrounded and formed by said side frames, said front frame and said bottom frame; and (C) combining said stopping frame with said side frames, said front frame and said bottom frame to close said space formed by said side frames, said front frame and said bottom frame.

Other objects, advantages, and novel features of the invention will become more apparent from the following detailed description when taken in conjunction with the accompanying drawings.

DETAILED DESCRIPTION OF THE PREFERRED EMBODIMENT

The housing of the present invention can be used for any conventional flat panel display (e.g. OLED, LCD, FED, PDP). Preferably, the housing of the present invention is used for a liquid crystal display panel. The frames of the present invention can be bound by various means. The means for binding frames of the present invention can be any conventional binding unit. Preferably, the binding unit is a male/female locking unit, a combination of tenons and grooves, or a hook. Most preferably, the binding unit is a hook. The bottom frame of the present invention can be in any conventional forms. The stopping frame of the present invention can selectively further comprise at least a binding unit on the surface of said stopping frame to combine or fasten said stopping frame with said side frames, said front frame or said bottom frame. The side frames can be any conventional frames. Preferably, the height of said side frame and said stopping frame is greater than the combined thickness of at least one flat panel display and/or a backlight module. Furthermore, the side frame can selectively be integrated with the bottom frame or the front frame as manufactured. Moreover, additional parts can be attached to the side frames, the bottom frame and the front frame to add the function of these frames. Preferably, the bottom frame comprises at least a binding unit on the surface of said bottom frame to combine or fasten said bottom frame with said side frames, said front frame or said stopping frame. The frames (e.g. the front frames, the bottom frames, the side frames and the stopping frames) of the present invention can be made of any conventional materials. Preferably, the frames (e.g. the front frames, the bottom frames, the side frames and the stopping frames) of the present invention is made of metals or plastics.

Figure 1:
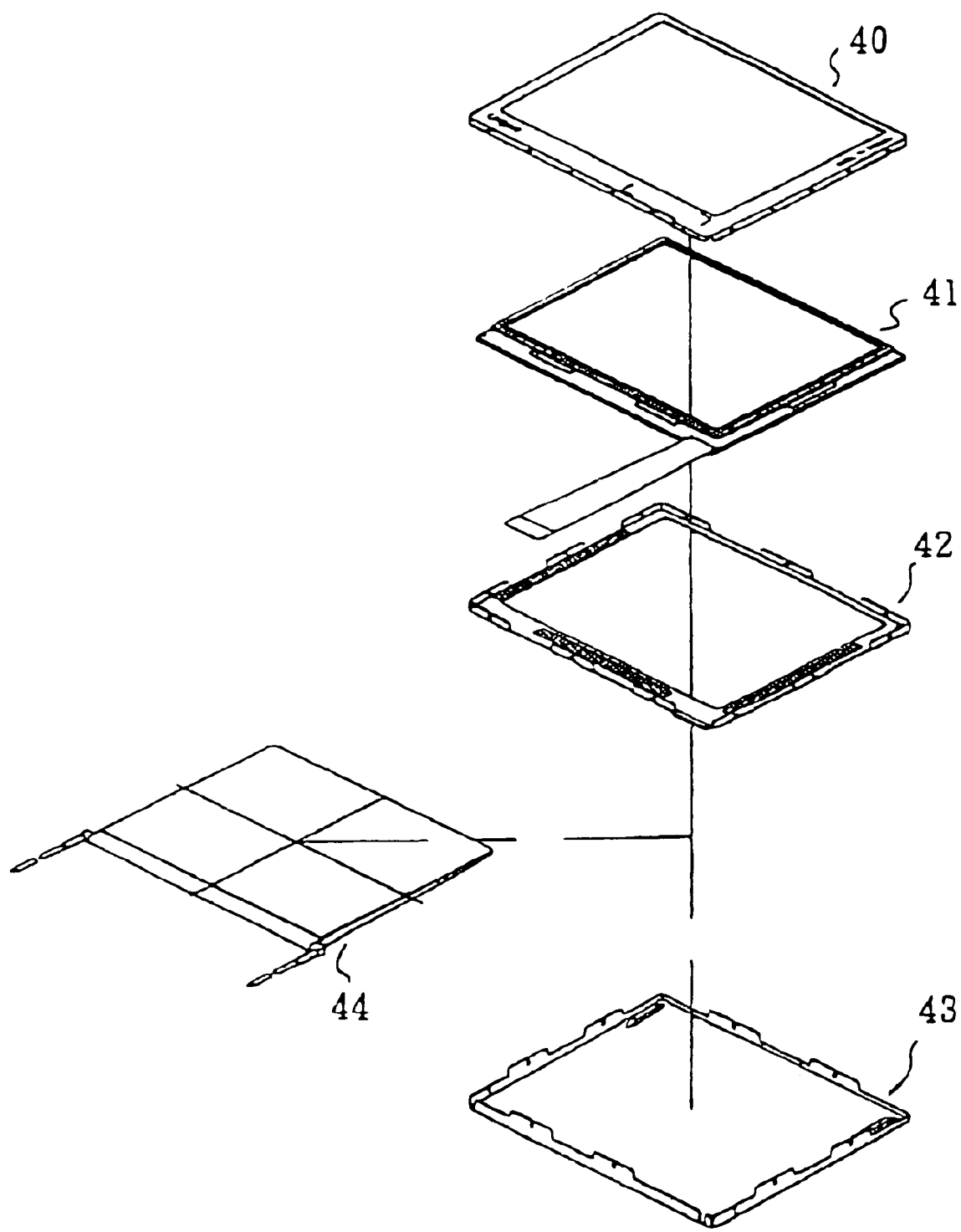
FIG. 1 is a perspective view of the conventional assembly of housing and the liquid crystal display panel.
Figure 2:
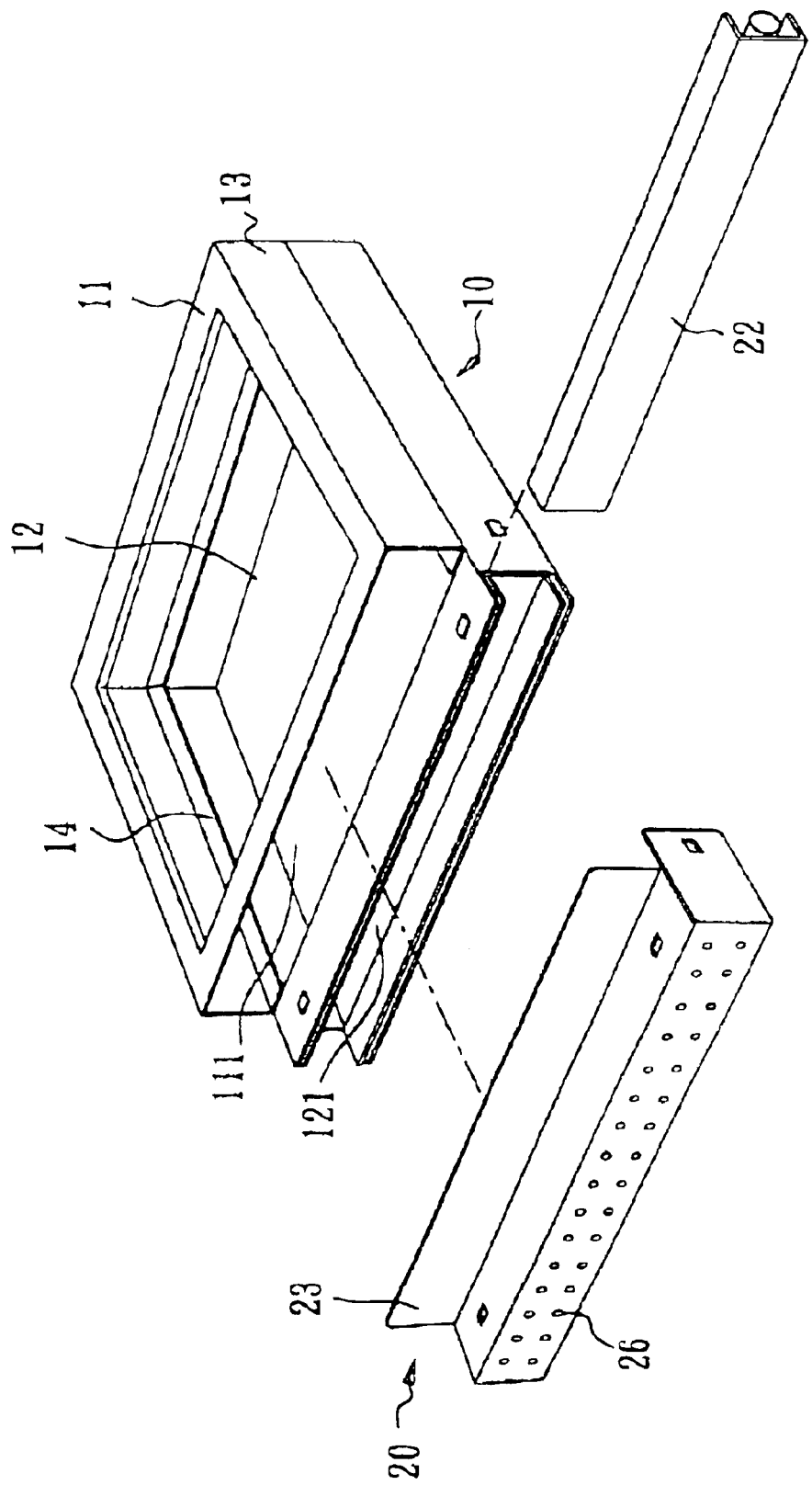
FIG. 2 is a perspective view of assembly of the housing of the present invention.

With reference to FIG. 2, there is shown a housing for a flat panel display and a backlight module of the present invention. The space inside the housing shown in FIG. 2 is used to accommodate a liquid crystal display panel (not shown) and a backlight module (not shown). The housing 10 of the present invention includes a front frame 11, a bottom plate or frame 12, a side frame 13, a separate frame 14 and a stopping frame 20. The front frame 11 of the present invention is a frame with a central open window. The central open window is in a rectangle shape. The inner edge of the front frame 11 defines the active area for the liquid crystal display panel. The bottom frame 12 of the present embodiment is a flat plate. The side frame 13 is a frame located between the front frame 11 and the bottom frame 12. The side frame 13 is in a shape of "□" to surround the edge of the liquid crystal display panel or the backlight module. The side frame 13 is arranged on and protruded from the surface of the front frame 13 to provide the height for the space surrounded by these frames. The side frame 13 is integrated with the front frame 11 and the bottom frame 12 to form a case having an opening 111 and a window. Inside the surface of the side frame 13 of the case, there is a separate frame 14. The separate frame 14 is used to separate or support the liquid crystal display panel and the backlight module. In the present embodiment, part of the separate frame 14 extends outside the case to form a track for sliding a reflector 22 for the light source. The opening 121 formed by the front frame 11, the bottom frame 12, and the side frame 13 is used for sliding in or out the liquid crystal display panel and the backlight module. The track on the extensive separate frame 14 and the bottom frame 12 is used for sliding the reflector 22 for the light source. The backlight module of the present embodiment includes at least a light source, a lightguide, diffuser films and prism films. The stopping frame 20 of the present embodiment is a frame having a cavity and a plurality of pores 26. The reflector 22 and the light source of the backlight module can be arrange in the cavity of the stopping frame 20 after assembling. The stopping frame 20 is used to close the opening 121 formed by the front frame 11, the bottom frame 12, the side frame 13 and optionally the separate frame 14. The pores 26 distributed on the surface of the stopping frame 20 function for the dissipation of heat. The pores 26 which penetrate the wall of the stopping frame 20 can discharge the heat produced by the light source through air convection. On the top of the stopping frame 20 of the present embodiment, is attached a shield 23 which protrudes from the surface of the stopping frame 20. The shield 23 of the stopping frame 20 is used for preventing the liquid crystal display from sliding out of the space 111 formed by the front frame 11, the separate frame 14 and the side frame 13. Furthermore, there are several binding units on the surface of the stopping frame 20, the front frame 11, the side frame 13 and the bottom frame 12 help binding frames together. The binding units of the present embodiment are male/female locking units. In addition, all the frames in the present embodiment are made of plastics or metals.

When the liquid crystal display panel and the backlight module are assembled together, a housing 10 with a space for sliding in the display panel and the backlight module is formed and provided first. The housing used here is a housing 10 as illustrated above. The liquid crystal display panel and the backlight module are slid from the lateral opening 121 of the space into the space surround by the frames. The stopping frames 20 close the lateral opening 121. The liquid crystal display panel and the backlight module are limited and fixed in the frames. The stopping frames 20 are fixed and combined with the side frames 13, front frames 11 or bottom frames 12 through male/female locking units on the stopping frames.

Through the help of the pores on the surface of the stopping frame, the temperature of the part of the liquid crystal display which is close to the light source is reduced greatly and distributed more homogeneously. Therefore, the coloring effect of the side area of the liquid crystal display can be well improved. In other words, the quality for displaying images can be improved substantially. On the other hand, since the flat panel display is slid into the space of the housing of the present invention through lateral opening of the space, the flat panel display can be assembled and disassembled much more easily. Moreover, on the top surface of the flat panel display, only one frame (e.g. the front frame) is needed to combine with the bottom frame, so that the number of frames for assembling is less than the number of the traditional frames. In other words, compared with the traditional assembly of the conventional frames and the flat panel display, the assembly of the flat panel display and the housing of the present invention is thinner, lighter and smaller. This means that much time and cost for developing, manufacturing new molds or frames for flat panel display can be saved greatly.

Although the present invention has been explained in relation to its preferred embodiment, it is to be understood that many other possible modifications and variations can be made without departing from the spirit and scope of the invention as hereinafter claimed.

What is claimed is:

1. A housing for receiving a flat panel display and a backlight module, comprising:

a front frame having a central window, wherein an inner edge of said front frame defines an active area for said flat panel display;

a bottom frame, comprising a flat plate;

a side frame located between said front frame and said bottom frame, said side frame comprises a space and at least one opening, wherein said space is used for locating said flat panel display and said backlight module, and said flat panel display and said backlight module are allowed to slide into said space through said opening;

at least one separate plate located on the inside surface of said side frame, said separate plate separates said flat panel display and said backlight module; and a stopping frame having a reflector, a cavity, and a plurality of pores to prevent said flat panel display and said backlight module from sliding out of said space formed by said side frame, said front frame and said bottom frame, wherein said reflector is located inside said cavity of said stopping frame, and said pores are located on the outer surface of said stopping frame.

2. The housing as claimed in claim 1, wherein said stopping frame further comprising tracks or grooves for guiding the sliding direction of said reflector or said stopping frame to close or open said opening of said frame.

3. The housing as claimed in claim 1, wherein said stopping frame further comprising a shield to prevent said flat panel display from sliding out of said space formed by said side frames, said front frame an said bottom frame.

4. The housing as claimed in claim 1, wherein said stopping frame further comprises a binding unit to combine said stopping frame with said side frames, said front frame or said bottom frame.

5. The housing as claimed in claim 1, wherein said binding unit is a hook or at least a groove.

6. The housing as claimed in claim 1, wherein said window is in a shape of a rectangle.

7. The housing as claimed in claim 1, wherein said flat panel display is a liquid crystal display panel.

8. The housing as claimed in claim 1, wherein said side frames, said front frame, said stopping frame, said separate frame or said bottom frame are made from metals or plastics.

9. A method for assembling a flat panel display and a backlight module, comprising following steps:

(A) providing a flat panel display, optionally a backlight module, and a housing for receiving a flat panel display, comprising:

a front frame having a central window, wherein the inner edge of said frame defines an active area for said flat panel display;

a bottom frame, comprising a flat plate;

a side frame located between said front frame and said bottom frame, said side frame comprises a space and at least one opening, wherein said space is used for locating said flat panel display and said backlight module, and said flat panel display and said backlight module are allowed to slide into said space through said opening;

at least one separate plate located on the inside surface of said side frame, said separate plate separates said flat panel display and said backlight module; and a stopping frame having a reflector, a cavity, a plurality of pores, and a binding unit, to prevent said flat panel display and said backlight module from sliding out of said space formed by said side frames, said front frame and said bottom frame, wherein said reflector is located inside said cavity of said stopping frame, and said pores are located on the outer surface of said stopping frame or dissipation of heat;

(B) sliding said flat panel display and said backlight module into said space surrounded and formed by said side frames, said front frame and said bottom frame; and (C) combining said stopping frame with said side frames, said front frame and said bottom frame to close said space formed by said side frames, said front frame and said bottom frame.

10. The method as claimed in claim 9, wherein said stopping frame further comprising tracks or grooves for guiding the sliding direction said reflector or said stopping frame to close or open said opening of said frame.

11. The method as claimed in claim 9, wherein said stopping frame further comprising a shield to prevent said flat panel display from sliding out of said space formed by said side frames, said front frame and said bottom frame.

12. The method as claimed in claim 9, wherein said binding unit comprises a hook or at least a groove.

13. The method as claimed in claim 9, wherein said window is in a shape of a rectangle.

14. The method as claimed in claim 9, wherein said flat panel display is a liquid crystal display panel.

15. The method as claimed in claim 9, wherein said side frames, said front frame, said stopping frame, said separate frame or said bottom frame is made from metals or plastics.

* * * * *